(12) United States Patent
Leung et al.

(10) Patent No.: US 7,953,324 B2
(45) Date of Patent: May 31, 2011

(54) SYSTEM AND METHOD FOR DATA SYNCHRONIZATION IN PASSIVE OPTICAL NETWORKS

(75) Inventors: Raymond W. K. Leung, Shenzhen (CN); Dongyu Geng, Shenzhen (CN); Dongning Feng, Shenzhen (CN); Frank Effenberger, Freehold, NJ (US); Sergio Benedetto, Turin (IT); Guido Montorsi, Turin (IT)

(73) Assignee: Huawei Technologies Co., Ltd., Shenzhen (CN)

( * ) Notice: Subject to any disclaimer, the term of this patent is extended or adjusted under 35 U.S.C. 154(b) by 641 days.

(21) Appl. No.: 11/939,470

(22) Filed: Nov. 13, 2007

(65) Prior Publication Data

US 2009/0123159 A1 May 14, 2009

(51) Int. Cl.
*H04B 10/00* (2006.01)
*H04J 14/00* (2006.01)

(52) U.S. Cl. ............... 398/58; 398/67; 398/68; 398/70; 398/71

(58) Field of Classification Search .................... 398/58, 398/66–68, 70–71
See application file for complete search history.

(56) References Cited

U.S. PATENT DOCUMENTS

| | | | |
|---|---|---|---|
| 2002/0120758 A1 | 8/2002 | Chang | |
| 2003/0043857 A1 | 3/2003 | Takagi et al. | |
| 2004/0264974 A1 | 12/2004 | Sorenson | |
| 2007/0206709 A1* | 9/2007 | Khermosh et al. | 375/343 |
| 2010/0040369 A1* | 2/2010 | Zhao et al. | 398/58 |
| 2010/0164575 A1* | 7/2010 | Suzuki et al. | 327/159 |

FOREIGN PATENT DOCUMENTS

| | | |
|---|---|---|
| CN | 1244751 A | 2/2000 |
| JP | 2004266524 A | 9/2004 |

OTHER PUBLICATIONS

International Search Report and the Written Opinion corresponding to the PCT application No. PCT/CN2007/071056, date of mailing Aug. 28, 2008, 10 pages total.
IEEE Computer Society, "IEEE Standard for Information Technology" dated Sep. 7, 2004.
Frank Effenberger, et al. "FEC Synchronization and Framing" Jan. 15, 2007.
Chinese Office Action for Application No. 200880000357.2 mailed Apr. 23, 2010.
International Searching Authority "Notification of Transmittal of the International Search Report and the Written Opinion of the International Searching Authority or the Declaration" for PCT/CN2007/071253 mailed Jul. 10, 2008.

(Continued)

*Primary Examiner* — Dalzid Singh (57) ABSTRACT

System and method for data synchronization in Passive Optical Networks. According to an embodiment, the present invention provides a method for providing upstream data synchronization in an optical communication network. The method includes sending data from an Optical Network Unit. The data includes a first data frame, which includes a header sequence, a synchronization segment, and a data segment. The synchronization segment includes 66 bits, which includes a first number of bits having nonzero values and a second number of bits having a value of zero. The first number is different from the second number. The method further includes receiving at least the first data frame by an Optical Line Terminal. The method also includes processing the first data frame. The method additionally includes selecting a first segment of the first data frame, the first segment including 66 bits.

13 Claims, 10 Drawing Sheets

OTHER PUBLICATIONS

International Searching Authority "Notification of Transmittal of the International Search Report and the Written Opinion of the International Searching Authority or the Declaration" for PCT/CN2008/073195 mailed Sep. 25, 2008.

Frank Effenberger(Huawei), Glen Kramer(Teknovus): "FEC synchronization and Framing",XP002604382, dated Jan. 15, 2007; total 26 pages.

Nowbakht A et al: "Design of optimum sync and detection patterns for frame synchronization", XP006022438, dated Aug. 5, 2004;total 2 pages.

Massey J L: "Optimum Frame synchronization", XP002545042, dated Apr. 1, 1972;total 5 pages.

Huawei Technologies: "Start of data delimiter with hamming distance=31", XP002604381, dated Nov. 15, 2007; total 6 pages.

Search report issued in corresponding European patent application No. 08757804.3 , dated Nov. 29, 2010; total 9 pages.

\* cited by examiner

SYSTEM AND METHOD FOR DATA SYNCHRONIZATION IN PASSIVE OPTICAL NETWORKS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates in general to telecommunication techniques. More particularly, the invention provides a method and system for providing data synchronization in Passive Optical Networks (PONs). In a specific embodiment, the present invention provides a technique for upstream synchronization using optimized Start of Data (SOD) sequences and the hardware implementation thereof. Merely by way of example, the invention is described as it applies to PONs, but it should be recognized that the invention has a broader range of applicability. For example, the invention can be applied to any communication systems uses specified sequences for data synchronization.

To improve readability and clarity of this application, acronyms are used. Below is a listed of acronyms:

| | |
|---|---|
| PON | Passive Optical Network |
| VoIP | Voice Over Internet Protocol |
| HDTV | High Definition Television |
| OLT | Optical Line Terminal |
| ONU | Optical Network Unit |
| ODN | Optical Distribution Network |
| TDM | Time Division Multiplexing |
| TDMA | Time Division Multiple Access |
| ID | Identification |
| SOD | Start of Data |
| HFP | High Frequency Pattern |
| AGC | Automatic Gain Control |
| CDR | Clock and Data Recovery |
| FSC | False Synchronization Candidates |
| HD | Hamming Distance |
| HDC | Hamming Distance Calculation |
| SDM | Synchronization Decision Module |
| MSB | Most Significant Bit |
| LSB | Least Significant Bit |

PON is one of the most promising access network technologies. This type of network provides many benefits, which include low maintenance cost, high bandwidth, low implementation cost, and others. PON can be an ideal platform for multi-play applications such as VoIP, data transmission, HDTV, etc.

Typically, PON is implemented as a point-to-multipoint medium based on a tree topology including an Optical Line Terminal (OLT), some Optical Network Units (ONUs) and an Optical Distribution Network (ODN) with splitters/couplers. One of the most attractive features of a PON is that the PON does not need any active component in the ODN.

Usually, PON system employs a point-to-multipoint access protocol so that all subscribed ONUs can share an OLT over an optical fiber. For example, the Time Division Multiplexing (TDM) broadcast for downstream transmission and Time Division Multiple Access (TDMA) for upstream transmission is widely used in current PON systems.

Figure 1:
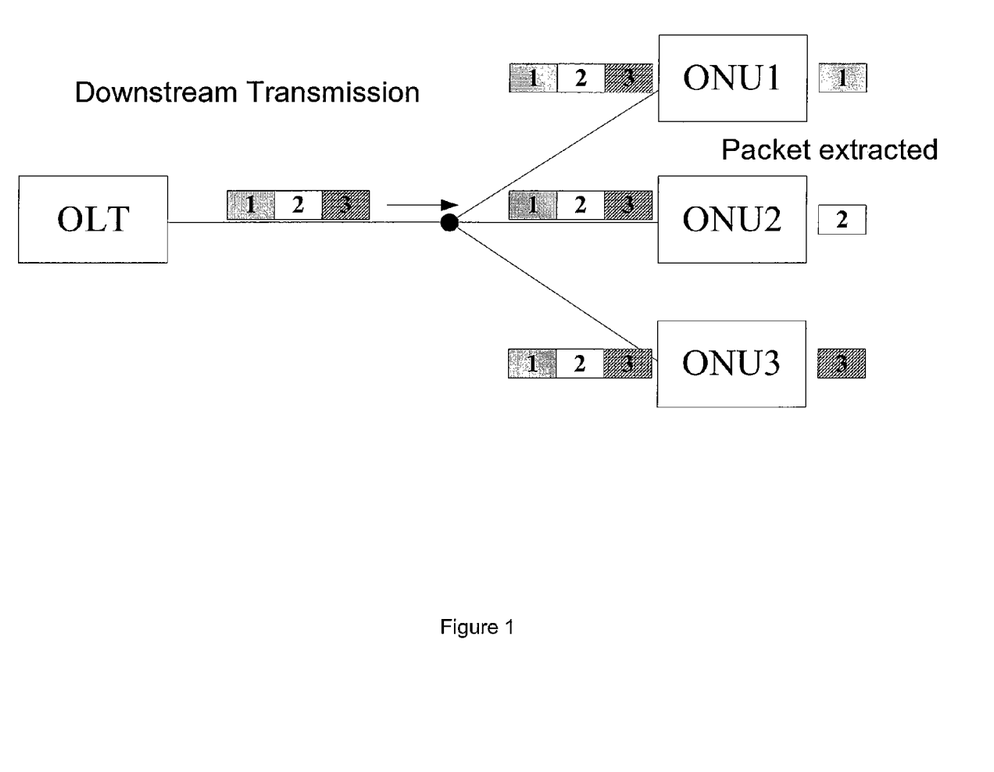
FIG. 1 illustrates a downstream transmission process in a PON system.

As merely an example, FIG. 1 illustrates a downstream transmission process in a PON system. The OLT broadcasts signals to all subscribed ONUs in the downstream transmission, the destination ONU will extract its belonging packets according to the destination identification (ID) of a packet and discard all other packets as in FIG. 1. For example, ONU-1 extracts the packet with its destination ID and sends to its corresponding end user; ONU-2 sends packet-2 to its end user, and so on.

Figure 2:
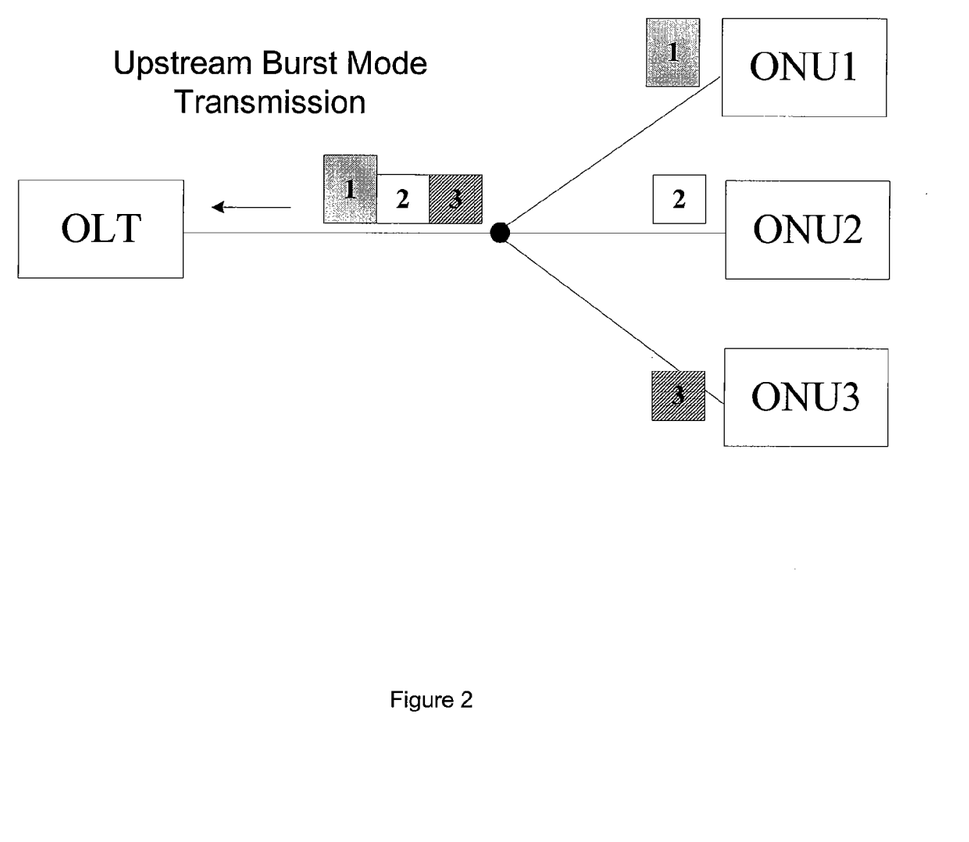
FIG. 2 illustrates an upstream transmission process in a PON system.

As merely an example, FIG. 2 illustrates an upstream transmission process in a PON system. The ONU transmits its signal in upstream channel of a PON system in a burst mode, which is different to the conventional point to point continuous mode transmission. ONU will first set up a communication link with the OLT, thereafter OLT will allocate different time slots to different ONUs in a TDMA fashion so that their signals will not overlap with each other when they reach the coupler in the ODN. As shown in FIG. 2, the ONU-1 only transmit its signal in its time slot (i.e., No. 1) and ONU-2 transmits its signal in its time slot (i.e., No. 2), and so on.

Figure 3:
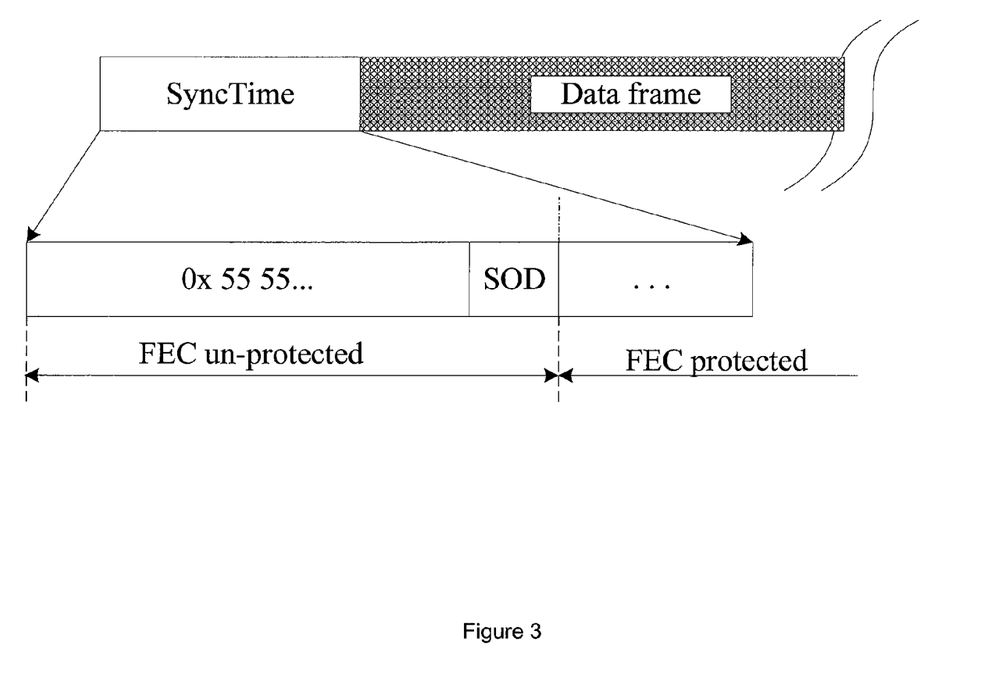
FIG. 3 is a simplified diagram illustrating a frame structure for upstream data.

FIG. 3 is a simplified diagram illustrating a frame structure for upstream data. A high frequency pattern (HFP) "0x 55 55 . . . " (0x means hexadecimal numbers and its binary form is 01010101 01010101 . . . ) is a special preamble sequence used by the OLT for Automatic Gain Control (AGC) and Clock and Data Recovery (CDR). The HFP is followed by a 66 bits long Start of Data <SOD> delimiter. The SOD is used to delineate the boundary of the data frame. The length of SOD delimiter is to make compatible with the 66-bit data frame structure. The section labeled FEC protected " . . . " could be one or several IDLE blocks that are used by OLT for de-scrambler re-synchronization and codeword delineation. Data are appended after this (these) IDLE block(s).

Figure 4:
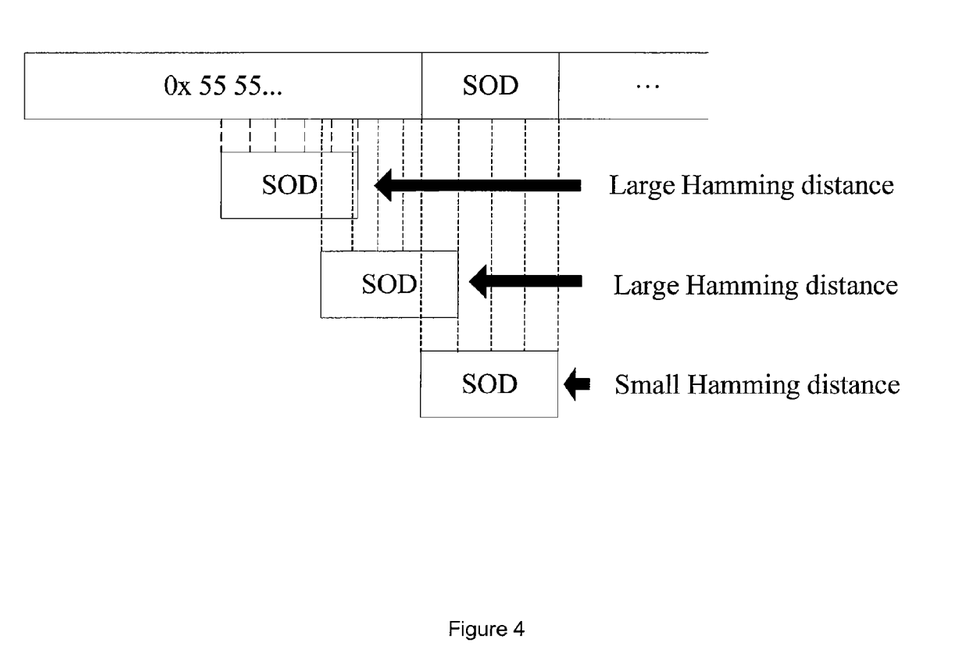
FIG. 4 is a simplified diagram illustrating the correlation between SOD delimiter and false synchronization candidates.

The SOD is useful in data synchronization. FIG. 4 is a simplified diagram illustrating the correlation between SOD and False Synchronization Candidates (FSC). After the OLT detected incoming signal and synchronize the signal with its clock reference, the OLT will send the received signal to the Boundary Detector. A SOD Correlator is embedded within the Boundary Detector module to test the correlation between the SOD delimiter and the received signal. The SOD Correlator will calculate the Hamming distance (HD) between the SOD delimiter and the received 66 bits data to determine the validation of burst synchronization, which is the same as delineate the boundary of the data frame. A false locking synchronization will output a truncated data frame to its higher layer, this may degrade the synchronization process. Therefore, the employed SOD delimiter should provide a false locking probability as low as possible. The SOD delimiter should be designed to minimize the correlation between the SOD delimiter and the FSC, in other words, maximize the HD between the SOD delimiter and the FSC.

As can be seen, various conventional techniques are available for data synchronization in optical networks. Unfortunately, these techniques are often inadequate for various reasons.

Therefore, improved system and method for data synchronization are desired.

BRIEF SUMMARY OF THE INVENTION

The present invention relates in general to telecommunication techniques. More particularly, the invention provides a method and system for providing data synchronization in PONs. In a specific embodiment, the present invention provides a technique for upstream synchronization using optimized SOD sequences and the hardware implementation thereof. Merely by way of example, the invention is described as it applies to PONs, but it should be recognized that the invention has a broader range of applicability. For example, the invention can be applied to any communication systems uses specified sequences for data synchronization.

According to an embodiment, the present invention provides a method for providing upstream data synchronization in an optical communication network. The method includes sending data from an ONU. The data includes a first data frame, which includes a header sequence, a synchronization segment, and a data segment. The synchronization segment includes 66 bits, which includes a first number of bits having nonzero values and a second number of bits having a value of zero. The first number is different from the second number. The method further includes receiving at least the first data frame by an OLT. The method also includes processing the first data frame. The method additionally includes selecting a first segment of the first data frame, the first segment including 66 bits. The method further includes comparing the first segment with a synchronization delimiter. Moreover, the method includes determining a Hamming distance based on the first segment. The method additionally includes determining a boundary of the first data frame.

According to another embodiment, the present invention provides a PON system includes a number of ONUs. The optical network includes a transmitter. Each ONU is configured to send data using the transmitter in a TDMA fashion. The data include a first data frame, which includes a header sequence, a synchronization segment, and a data segment. The synchronization segment including 66 bits, which includes a first number of bits having nonzero values and a second number of bits having a value of zero. The first number is different from the second number. The system also includes an OLT. The OLT includes a receiver that is configured to receive at least the first data frame. The OLT also includes a shifter register for storing the first data frame. The OLT includes a logic circuit for comparing the first segment with a synchronization delimiter. The OLT additionally includes a Hamming distance module for determining a Hamming distance based on the first segment. The OLT includes a Synchronization Decision Module (SDM) determining a boundary of the first data frame.

It is to be appreciated that embodiments of the present invention provides various advantages over conventional techniques. Among other things, by using optimized synchronization delimiter sequences and the hardware thereof, the synchronization process is optimized both for speed and reliability. In addition, embodiments of the present invention can be easily implemented using and/or in conjunction with conventional systems with minimal modification. There are other benefits as well, which are described below.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a method and system for providing data synchronization in PONs. In a specific embodiment, the present invention provides a technique for upstream synchronization using optimized SOD sequences and the hardware implementation thereof. Merely by way of example, the invention is described as it applies to PONs, but it should be recognized that the invention has a broader range of applicability. For example, the invention can be applied to any communication systems uses specified sequences for data synchronization.

As discuss above, conventional data synchronization techniques are often inadequate for various reasons, which are explained in detail below.

Figure 5:
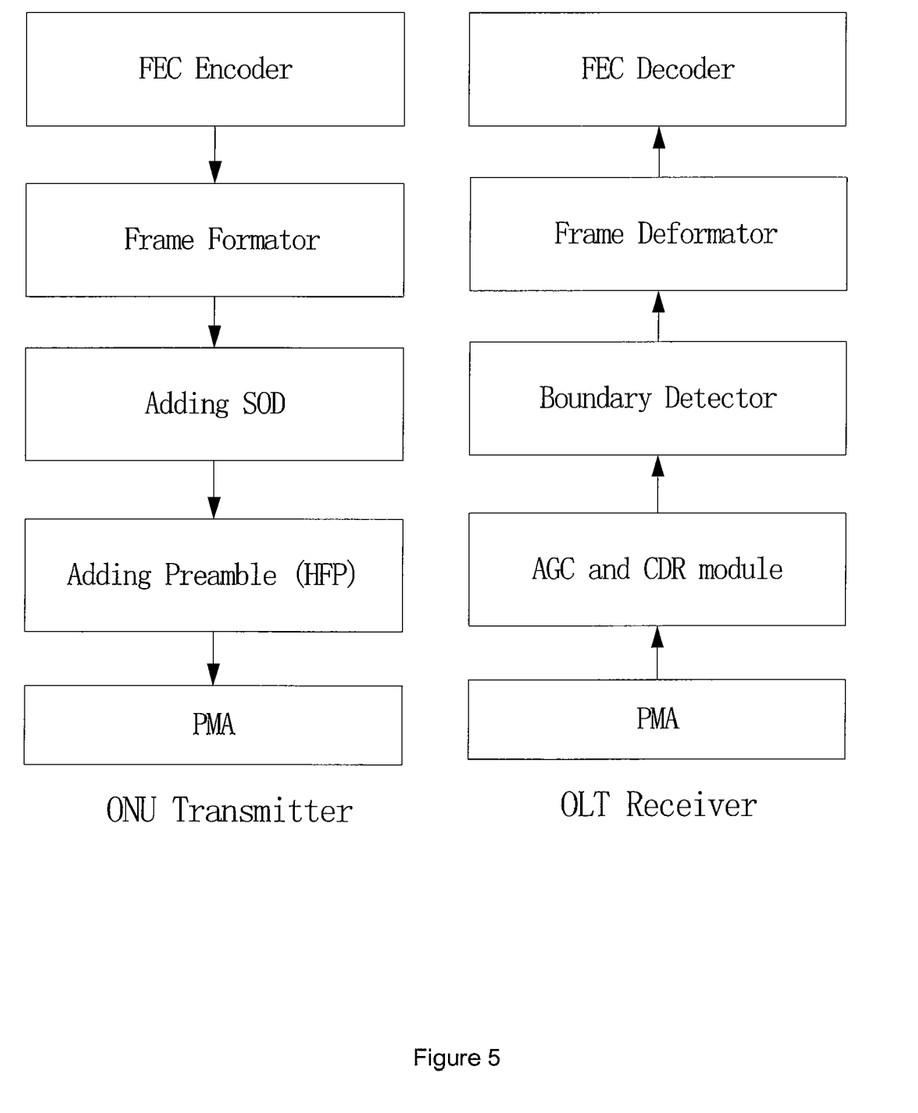
FIG. 5 is a simplified diagram illustrating upstream transmission from an ONU to an OLT in a PON system.

FIG. 5 is a simplified diagram illustrating upstream transmission from an ONU to an OLT in a PON system. The FEC codewords are composed to form an upstream data frame in the Frame Formator.

Figure 6:
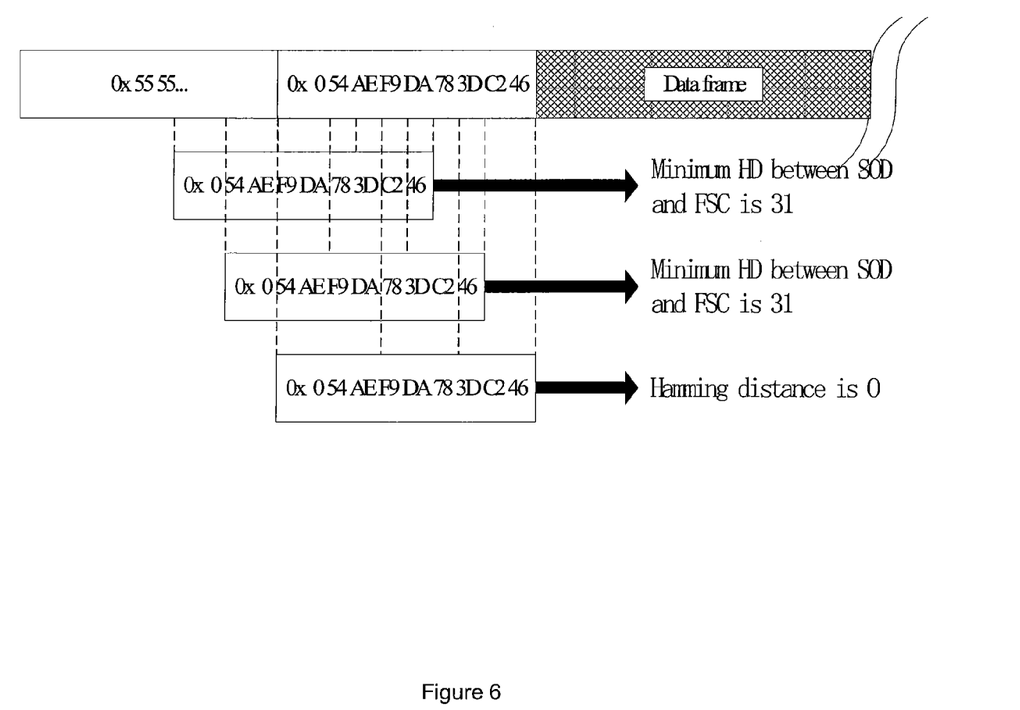
FIG. 6 is a simplified diagram illustrating SOD delimiter being used in data frame.

The HFP and the SOD delimiter sequence will then be appended to the beginning of the data frame as shown in FIG. 3, respectively. The currently employed SOD is a 66 bits binary sequence. For example, the binary sequence is the following, {00 01010100 10101110 11111001 11011010 01111000 00111101 11000010 01000110} and its hexadecimal representation is {0 54 AE F9 DA 78 3D C2 46}. The minimum distance of the current employed SOD delimiter and the FSC is 31. As an example, FIG. 6 is a simplified diagram illustrating SOD delimiter being used in data frame.

In a PON system, the distances between subscribed ONUs and the OLT are different, hence the optical signal power loss and channel penalties are different to different ONUs. For example, power levels for signals are different when they arrive at the OLT. Therefore, it is usually a requirement for the OLT to automatically adjust the received power level and synchronize the received signal correctly with its clock reference. Usually, these functions are performed by the AGC and CDR module in the OLT.

At the OLT side, the Boundary Detector includes a SOD Correlator. Among other things, the SOD Correlator is used for delineating the data frame boundary of the upstream signal from the ONU. For example, as shown in FIG. 3, the SOD delimiter is not protected by the FEC code, and the bit error probability is relatively high. The SOD Correlator is required to tolerate bit errors since the transmitted SOD delimiter at the receiver side is often very likely be corrupted by bit errors. For example, the number of bit errors can be tolerated by the SOD Correlator is defined by a predetermined synchronization threshold. Often the synchronization threshold in the SOD Correlator is decided according to the operating bit error level.

By setting up a suitable synchronization threshold, the SOD Correlator of OLT can effectively delineate the received signal quickly and minimize the mean time of false lock occurrence. Typically, conventional systems set the synchronization threshold of the SOD Correlator at 12. If the computed HD between the SOD delimiter and the 66 bits received data is less than 12, then the OLT declares a successful synchronization with the received signal. On the other hand, if the HD is equal or larger than 12 then the received signal is shifted by one bit and the SOD Correlator re-calculates the HD between the SOD delimiter and the new 66 bits data until a successful synchronization is declared.

There are various problems with the conventional approach discussed above. Among other things, since the SOD delimiter is not protected by the FEC code, the bit error probability of the SOD delimiter over the transmission channel is often high. As a result, it requires the SOD delimiter to have a large HD between the SOD delimiter and the FSC. For example, conventional SOD delimiter and the FSC have a minimum HD equal to 31.

However, the theoretical suggested minimum HD between a SOD delimiter and FSC can be calculated using Equation 1 below:

$$\text{Minimum Hamming Distance} = \left\lfloor \frac{N-1}{2} \right\rfloor = \left\lfloor \frac{66-1}{2} \right\rfloor = 32, \quad \text{Equation 1}$$

$N$ is length of SOD

The theoretical suggested value of the maximum synchronization threshold, such that the performance of SOD Correlator can be calculated using Equation 2 below:

$$\text{Delineation Threshold } T = \left\lfloor \frac{N}{4} \right\rfloor - 1 = 16 - 1 = 15 \quad \text{Equation 2}$$

It is to be appreciated that an objective of the present invention is to provide a set of Start of Data <SOD> delimiters in which they comply with the theoretical suggested value. For example, the minimum HD between the SOD delimiter and the FSC is 32.

In a specific embodiment, the present invention provides a SOD correlation circuit based on the using one or more SOD delimiters. Among other things, the embodiment provides a fast synchronization algorithm for various synchronization thresholds.

Depending on the application, various SOD delimiters may be used. As an example, Table 1 below illustrates four exemplary SOD delimiters:

TABLE 1

| SOD length (bits) | SOD Delimiter (hexadecimal numbers) | Minimum HD between SOD and FSC | Allowable Max Synchronization Threshold |
|---|---|---|---|
| 66 | 1 16 A2 DC 69 F0 CD EE 40 | 32 | 15 |
| 66 | 1 5A E3 94 B6 66 C7 E0 03 | 32 | 15 |
| 66 | 1 7F A0 96 0E 14 A7 33 66 | 32 | 15 |
| 66 | 1 70 3A 08 6D ED 4E 99 66 | 32 | 15 |
| 66 | 0 41 BD B2 B3 D5 A7 C8 F0 | 32 | 15 |

The SOD delimiters as shown in Table 1 comply with the theoretical suggested minimum HD between a SOD delimiter and FSC. Among other things, the SOD delimiters have sixteen "0"s and seventeen "1"s on the 33 even positions and on the 33 odd positions, or vice versa. As a consequence, the SOD have a number of "0" not equal to the number of "1", (e.g., either 32 "0"s plus 34 "1"s or 34 "0" s plus 32 "1"s). As an example, all the SOD delimiters, in their binary forms, all conform to the described requirement. For example, the following SOD delimiters have 34 "0"s and 32 "1"s in their hexadecimal and binary form, respectively:

0x 1 16 A2 DC 69 F0 CD EE 40
01 00010110 10100010 11011100 01101001 11110000 11001101 11101110 01000000
0x 1 5A E3 94 B6 66 C7 E0 03
01 01011010 11100011 10010100 10110110 01100110 11000111 11100000 00000011
0x 1 7F A0 96 0E 14 A7 33 66
01 01111111 10100000 10010110 00001 10 00010100 10100111 00110011 01100110
0x 1 70 3A08 6D ED 4E 99 66
01 01110000 00111010 00001000 01101101 11101101 01001110 10011001 01100110

The following delimiter has 32 "0"s and 34 "1"s.
0x 0 41 BD B2 B3 D5 A7 C8 F0
00 01000001 10111101 10110010 10110011 11010101 10100111 11001000 11110000

The SOD delimiters shown in Table 1 comply with the theoretical suggested minimum HD between the SOD delimiter and the FSC. For example, these SOD delimiters, as well as other SOD delimiters contemplated by the present invention, can be used to replace conventional SOD delimiter so that the minimum HD can be increased from 31 to 32 without additional complexity or modifying the existing data frame structure. In other word, the present invention can decrease the false locking probability without any extra cost.

In an embodiment, a SOD delimiter complies with the theoretical suggested value of the minimum HD between a SOD delimiter and FSC. The SOD delimiter must have sixteen "0"s and seventeen "1"s on the 33 even positions and on the 33 odd positions, or vice versa. Consequently, the number of "0"s must not be equal to the number of "1"s, (e.g., 32 "0"s plus 34 "1"s, or 34 "0"s plus 32 "1"s).

To implement the embodiment, the binary form of the Hexadecimal sequence is a 66 bits long sequence. For example, the binary form of {0x 1 16 A2 DC 69 F0 CD EE 40} is {01 00010110 10100010 11011100 01101001 11110000 11001101 11101110 01000000}. It should be noted that every hexadecimal number represent 4 binary bits, except the first hexadecimal number or the leading number, which represents 2 binary bits.

Figure 7:
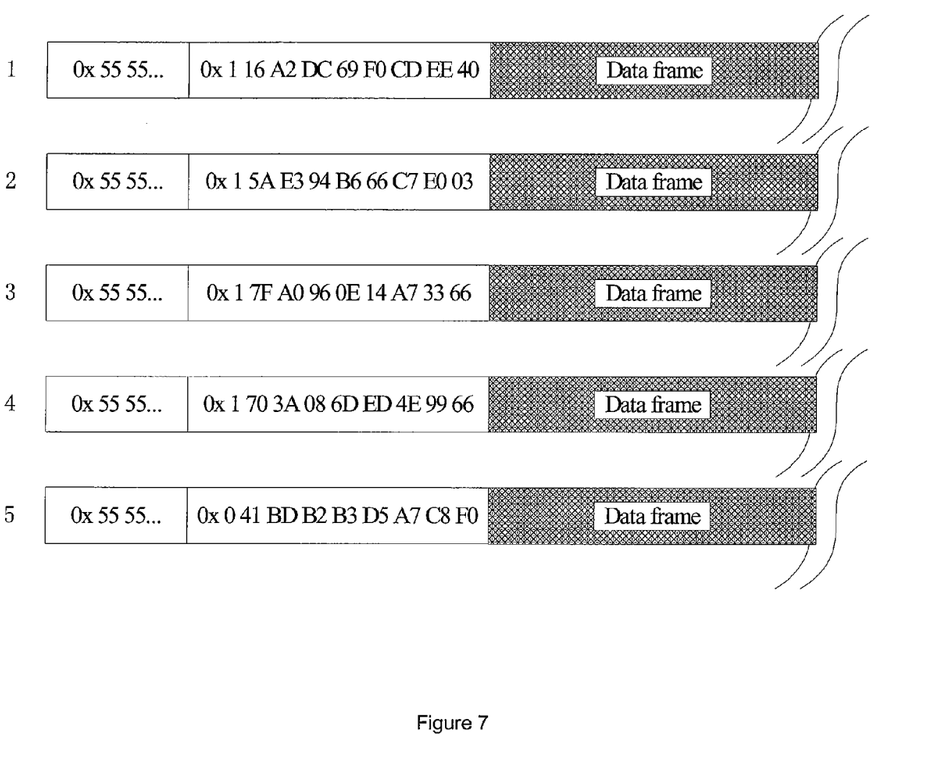
FIG. 7 is a simplified diagram illustrating an upstream data frame structure of a 10G EPON system according to an embodiment of the present invention.

FIG. 7 is a simplified diagram illustrating an upstream data frame structure of a 10G EPON system according to an embodiment of the present invention. This diagram is merely an example, which should not unduly limit the scope of the claims. One of ordinary skill in the art would recognize many variations, alternatives, and modifications. As shown in FIG. 7, the SOD delimiters as listed in Table 1 are used in the data frames.

It is to be appreciated that embodiments of the present invention have a wide range of applicability and can be used in any systems that use SOD delimiters for synchronization with the received signal or for delineating the boundary of data frame. In a specific embodiment, the invention is to be used in a 10G EPON system based on IEEE 802.3 standards.

At the ONU transmitter side, the SOD delimiter is appended to the beginning of the FEC coded data frame as well as the HFP. For example, the HFP is used as a preamble for the transmitted upstream signal.

At the OLT receiver side, the SOD Correlator calculates the HD between the received signal and the SOD delimiter to test if the HD is less than the system's synchronization threshold. In contrast to conventional systems, the synchronization threshold is adjustable according to the requirement of the system. For example, the false locking probability can be minimized if T is set to be 0.

Figure 8A:
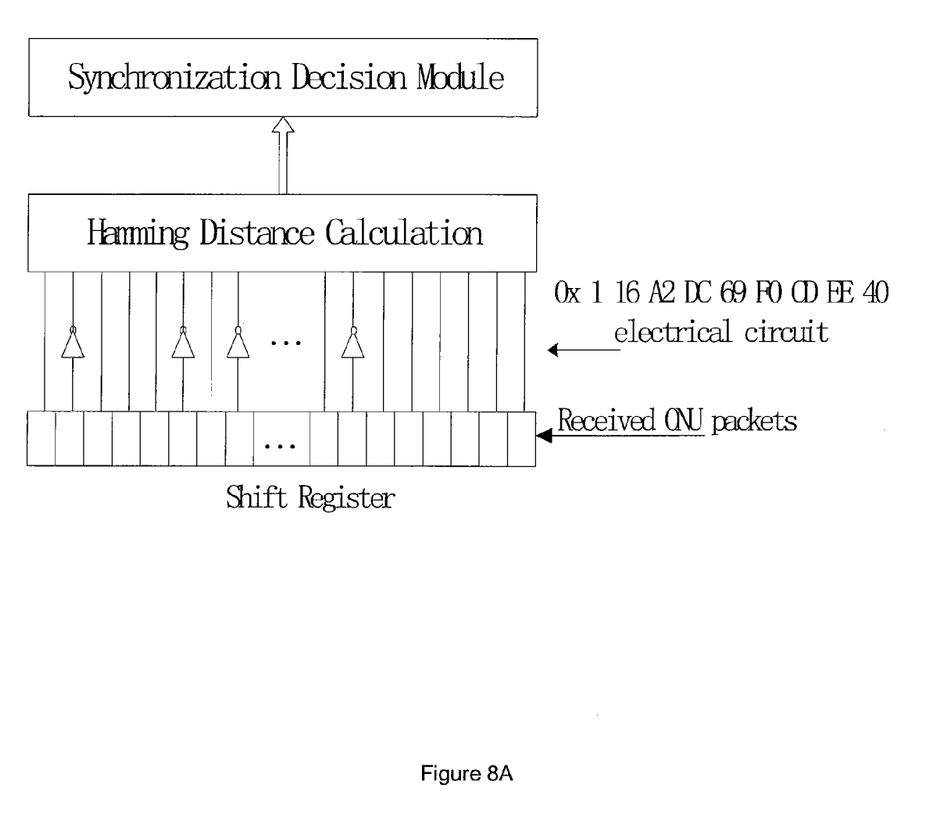
FIG. 8A is a simplified diagram illustrating a synchronization circuit of the SOD Correlator according to an embodiment of the present invention.

FIG. 8A is a simplified diagram illustrating a synchronization circuit of the SOD Correlator according to an embodiment of the present invention. This diagram is merely an example, which should not unduly limit the scope of the claims. One of ordinary skill in the art would recognize many variations, alternatives, and modifications. As shown in FIG. 8A, a shifter register is used to process the receive ONU packets and providing the processed packets to the Hamming distance calculation (HDC) module. The Hamming distance calculation module determines the delineation based on the Hamming distance calculation.

Figure 8B:
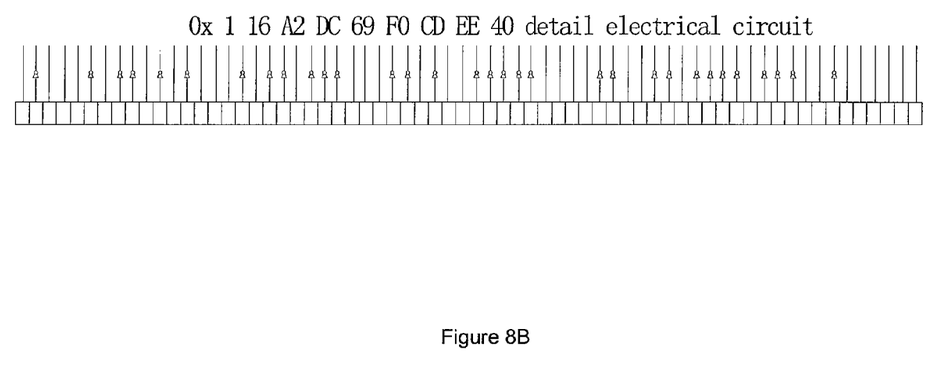
FIG. 8B is a simplified diagram illustrating hard logic for providing SOD delimiter logic according to an embodiment, of the present invention.

FIG. 8B is a simplified diagram illustrating hard logic for providing SOD delimiter logic according to an embodiment, of the present invention. This diagram is merely an example, which should not unduly limit the scope of the claims. One of ordinary skill in the art would recognize many variations, alternatives, and modifications. As shown, the SOD delimiter for this particular situation is "0x 1 16 A2 DC 69 F0 CD EE 40".

As long as the OLT detects an upstream signal from the ONU, it synchronizes its clock reference with the upstream signal. The OLT then sends the received data into the Shift Register of the SOD Correlator. Once the Shift Register has been filled with 66 bits received data, it passes these 66 bits through an electrical circuit that is based on the SOD delimiter. The electrical circuit is defined as the following: every bit of the SOD delimiter responds to a direct electric logic form the Shift Register to HDC module. If the bit of the corresponding bit of the SOD delimiter is "0", then the originally received data bit is sent to the HDC module unchanged. On the other hand, if the corresponding bit of the SOD is "1", then it passes the binary complement value of the received data bit to the HDC module (i.e., "0" changed to "1" or "1" changed to "0"). The HDC module calculates the corresponding HD and pass the output to the Synchronization Decision Module (SDM). Finally, the SDM determines if it is a valid synchronization or not. If a successful synchronization is declared, then the OLT knows the beginning of the data frame and starts to receive data.

In an embodiment, the present invention provides a fast synchronization algorithm on the binary format of the HD from the SDM. The algorithm is implemented with the 66-bits SOD delimiter. The minimum HD between the SOD delimiter and all possible 66 bits binary sequence is 0. The maximum HD between the SOD delimiter and all possible 66 bits binary sequence is 66. Since $2^6<66<2^7$, it requires at least 7 binary bits to represent the resulted HD in a binary format.

According to Table 2, the SDM can count on the number of consecutive "0" bits from the Most Significant Bit (MSB) to Least Significant Bit (LSB) to determine whether it is a valid synchronization or not, if the synchronization threshold T is to be set as $T=8=2^3$ or $T=16=2^4$. For example, if T=8, then the SDM just need to check if the first 4 consecutive bits are 0 or not.

TABLE 2

| Hamming Distance | HD binary format (MSB)    (LSB) |
|---|---|
| 0 | 0 0 0 0 0 0 0 |
| 1 | 0 0 0 0 0 0 1 |
| 2 | 0 0 0 0 0 1 0 |
| 3 | 0 0 0 0 0 1 1 |
| 4 | 0 0 0 0 1 0 0 |
| 5 | 0 0 0 0 1 0 1 |
| 6 | 0 0 0 0 1 1 0 |
| 7 | 0 0 0 0 1 1 1 |
| 8 | 0 0 0 1 0 0 0 |
| 9 | 0 0 0 1 0 0 1 |
| 10 | 0 0 0 1 0 1 0 |
| 11 | 0 0 0 1 0 1 1 |
| 12 | 0 0 0 1 1 0 0 |
| 13 | 0 0 0 1 1 0 1 |
| 14 | 0 0 0 1 1 1 0 |
| 15 | 0 0 0 1 1 1 1 |
| 16 | 0 0 1 0 0 0 0 |

Assuming the number of bits required to represent the binary form of HD is n, and the synchronization threshold is set to be $T=2^m$, where $0 \leq m \leq n$. Then the SDM can decide if it is a valid synchronization by checking whether the first n-m consecutive bits are 0's or not. If they are all 0, then SDM can declare a successful synchronization. Otherwise the Shift Register will shift one bit to obtain a "new" 66 bits data to be tested with the SOD delimiter.

It is to be appreciated that various embodiments of the present invention provide numerous advantages over conventional techniques. Among other thing, the data frame implemented using an SOD delimiter according to the present invention can decrease the false locking probability. At the same time, this implementation does not introduce any complexity overhead.

Figure 9:
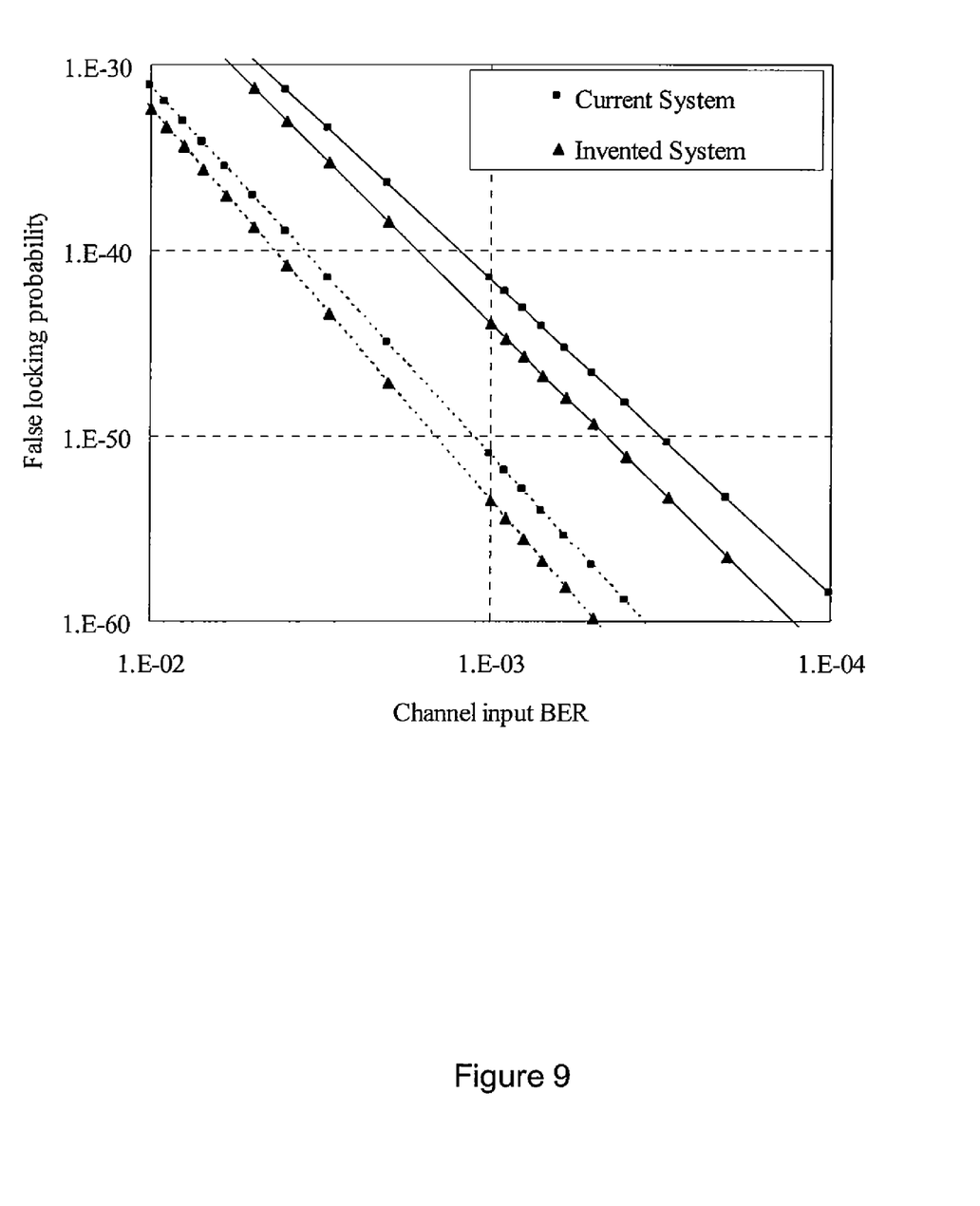
FIG. 9 is a graph illustrating the comparison of false locking probability between existing techniques and an embodiment of the present invention.

FIG. 9 is a graph illustrating the comparison of false locking probability between existing techniques and an embodiment of the present invention. As an example, the length of the HFP is 4000 bits. From the graph in FIG. 9, it can be seen that the false locking probability is much lower with the embodiment of the present invention. The dotted lines represent the Threshold T=12 and the dash lines represent the Threshold T=15.

In addition to better performance, embodiments of the present invention also provide more flexibility when compared to conventional systems. For example, synchronization Threshold T is adjustable according to the system requirement. Fast synchronization algorithms can be adopted for different threshold values.

Among other things, embodiments of the present invention provide five Start of Data <SOD> delimiters. Each of the SOD delimiter is ideally suited for Ethernet PON upstream transmission.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for providing upstream data synchronization in an optical communication network, the method comprising:
sending data from an Optical Network Unit comprising a transmitter, the data comprising a first data frame, the first data frame comprising a header sequence, a synchronization segment, and a data segment, the synchronization segment including 66 bits, the 66 bits including a first number of bits having nonzero values, and a second number of bits having a value of zero, the first number being different from the second number;
receiving at least the first data frame by a receiver of an Optical Line Terminal;
storing the first data frame by a shifter register of the Optical Line Terminal;
comparing a first segment of the first data frame with a synchronization delimiter by a logic circuit of the Optical Line Terminal;
determining a Hamming distance based on the first segment of the first data frame by a Hamming distance module of the Optical Line Terminal; and
determining a boundary of the first data frame by a delineation decision module of the Optical Line terminal.

2. The method of claim 1, further comprising:
shifting the first data frame;
selecting a second segment of the first data frame; and
comparing the second segment of the first data frame with the synchronization delimiter.

3. The method of claim 1, wherein the synchronization segment has a first number that equals to 32 and a second number that equals to 34, and the synchronization segment has one of following sequences:
Sequence 1 in hexadecimal form: 1 16 A2 DC 69 F0 CD EE 40,
Sequence 1 in binary form:
0100010110 0100010 11011100 01101001 11110000 11001101 11101110 01000000,
Sequence 2 in hexadecimal form: 1 5A E3 94 B6 66 C7 E0 03,
Sequence 2 in binary form:
011011010 11100011 10010100 10110110 01100110 11000111 11100000 00000011,
Sequence 3 in hexadecimal form: 1 7F A0 96 0E 14 A7 33 66,
Sequence 3 in binary form:
011111111 10100000 10010110 00001110 00010100 10100111 00110011 01100110,
Sequence 4 in hexadecimal form: 1 70 3A 08 6D ED 4E 99 66
Sequence 4 in binary form:
011110000 00111010 00001000 01101101 11101101 01001110 10011001 01100110.

4. The method of claim 1, wherein the synchronization segment has a first number that equals to 34 and a second number that equals to 32, and the synchronization segment has a sequence of:
Sequence 5 in hexadecimal form: 041 BD B2 B3 D5 A7 C8 F0
Sequence 5 in binary form:
001000001 10111101 10110010 10110011 11010101 10100111 11001000 11110000.

5. The method of claim 1 further comprising decoding the first data frame based on the boundary.

6. The method of claim 1 wherein the Hamming distance has a minimum value of 32.

7. The method of claim 1 wherein the determining a Hamming distance comprising calculating a distance between the first segment and the synchronization delimiter.

8. The method of claim 1 wherein the synchronization segment is associated with a synchronization threshold value of 15.

9. A Passive Optical Network system, comprising:
an Optical Network Unit, the optical network comprising a transmitter, wherein the Optical Network Unit is configured to send data using the transmitter, the data comprises a first data frame, the first data frame comprises a header sequence, a synchronization segment, and a data segment, the synchronization segment includes 66 bits, the 66 bits includes a first number of bits having nonzero values, and a second number of bits having a value of zero, the first number is different from the second number; and
an Optical Line Terminal, wherein the Optical Line Terminal comprises:
a receiver, configured to receive at least the first data frame,
a shifter register, configured to store the first data frame;
a logic circuit, configured to compare a first segment of the first data frame with a synchronization delimiter;
a Hamming distance module, configured to determine a Hamming distance based on the first segment of the first data frame; and
a delineation decision module, configured to determine a boundary of the first data frame.

10. The system of claim 9 wherein the shift register comprises at least 66 bits.

11. An Optical Network Unit (ONU) for providing upstream data synchronization in an optical communication network, the ONU transmitter comprising:
an Forward Error Correction (FEC) encoder, configure to encode data and obtain a forward error correction codeword; and
a frame formatter, configure to format the codeword into an upstream data frame,
wherein the upstream data frame comprises a first data frame, the first data frame comprises a header sequence, a synchronization segment, and a data segment, the synchronization segment includes 66 bits, the 66 bits includes a first number of bits having nonzero values, and a second number of bits having a value of zero, and the first number is different from the second number.

12. An Optical Line Terminal (OLT), comprising:
a receiver, configured to receive at least a first data frame, wherein the first data frame comprises a header sequence, a synchronization segment, and a data segment, the synchronization segment includes 66 bits, the 66 bits includes a first number of bits having nonzero values, and a second number of bits having a value of zero, the first number is different from the second number,
a shifter register configured to store the first data frame;
a logic circuit, configured to compare a first segment of the first data frame with a synchronization delimiter;
a Hamming distance module, configured to determine a Hamming distance based on the first segment of the first data frame; and
a delineation decision module, configured to determine a boundary of the first data frame.

13. The OLT of claim 12, wherein the shift register comprises at least 66 bits.

* * * * *